United States Patent [19]
Bolger

[11] 4,331,225
[45] May 25, 1982

[54] POWER CONTROL SYSTEM FOR ELECTRICALLY DRIVEN VEHICLE

[76] Inventor: John G. Bolger, 469 Tahos Rd. E, Orinda, Calif. 94563

[21] Appl. No.: 31,372

[22] Filed: Apr. 19, 1979

Related U.S. Application Data

[63] Continuation-in-part of Ser. No. 899,786, Apr. 25, 1978, abandoned.

[51] Int. Cl.³ ............................................. B60L 9/00
[52] U.S. Cl. .................................................... 191/10
[58] Field of Search ............................ 191/10, 16–19, 191/4, 11

[56] References Cited

U.S. PATENT DOCUMENTS 3,914,562  10/1975  Bolger .................. 191/4 X

FOREIGN PATENT DOCUMENTS 657035  9/1951  United Kingdom ................. 191/10
657036  9/1951  United Kingdom ................. 191/10

*Primary Examiner*—Richard A. Schacher
*Attorney, Agent, or Firm*—Owen, Wickersham & Erickson

[57] ABSTRACT

An electrically driven vehicle having suitable batteries to drive the vehicle on conventional roads and a pickup receiver thereon for receiving power for a drive motor from a conductor embedded in a prepared roadway for driving the vehicle and for charging the batteries. The pickup receiver is supported on the vehicle so that it establishes a small air gap with the conductor for operation on a specially prepared roadway. On some vehicles the pickup receiver may be lowered to the proper position for operation on the special roadway and then raised to provide sufficient clearance to accommodate normal obstacles, such as driveway gutters, when the vehicle is driven on conventional roads. When driving on the prepared roadway with the power pickup receiver in a fixed down position forming a nominal air gap with the road conductor, electrical control is provided for automatically maintaining a relatively constant output from the power pickup receiver despite variations in the energy consumed by the motor or the size of the air gap.

14 Claims, 10 Drawing Figures

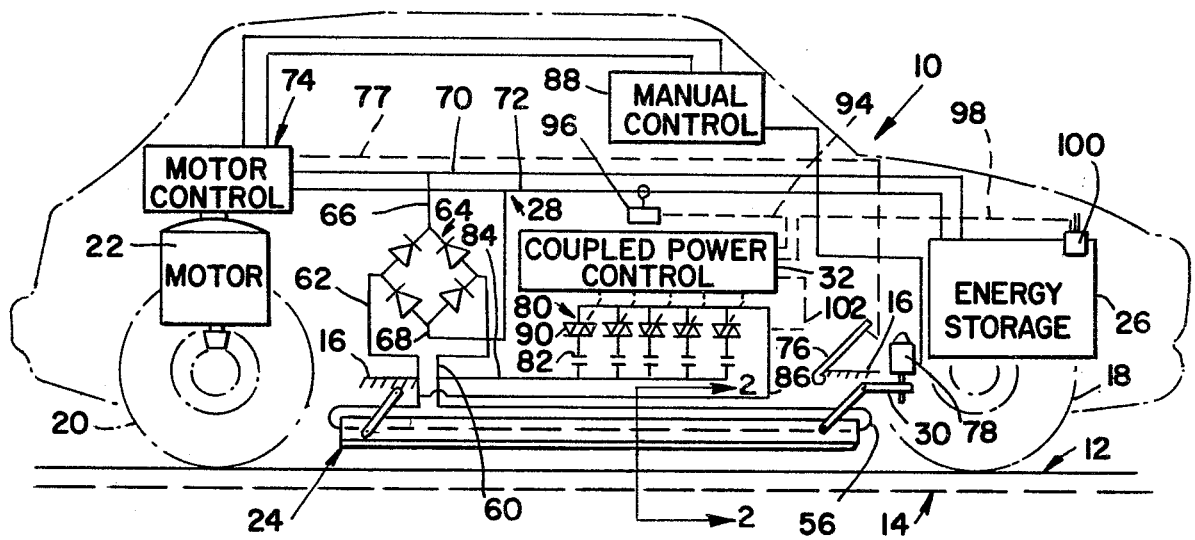
FIG_1
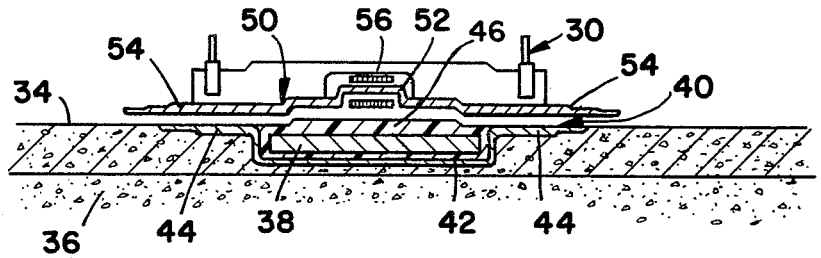
FIG_2
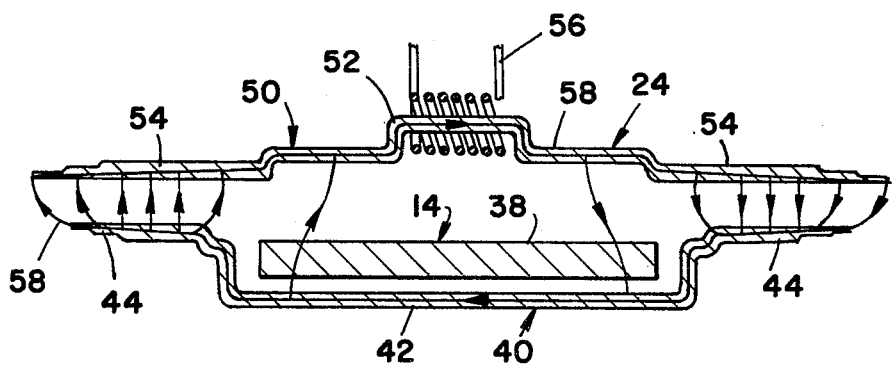
FIG_3

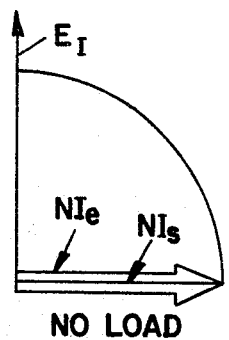
NO LOAD
FIG_4a
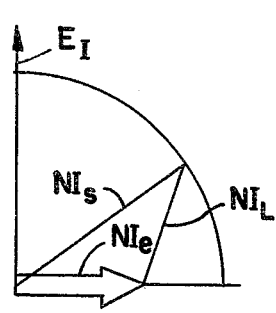
UNCOMPENSATED LOAD
FIG_4b
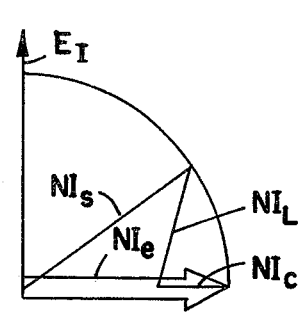
COMPENSATED LOAD
FIG_4c
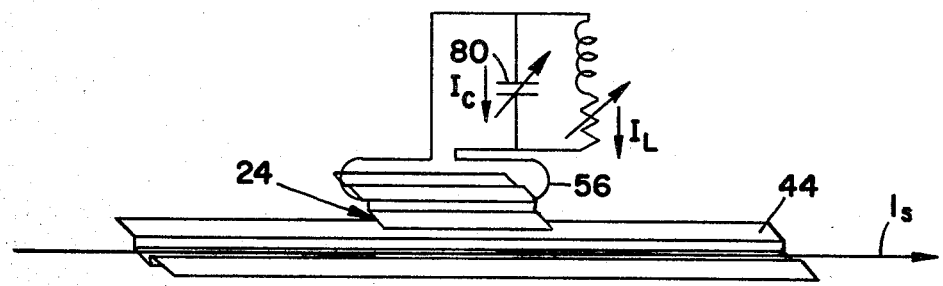
FIG_5
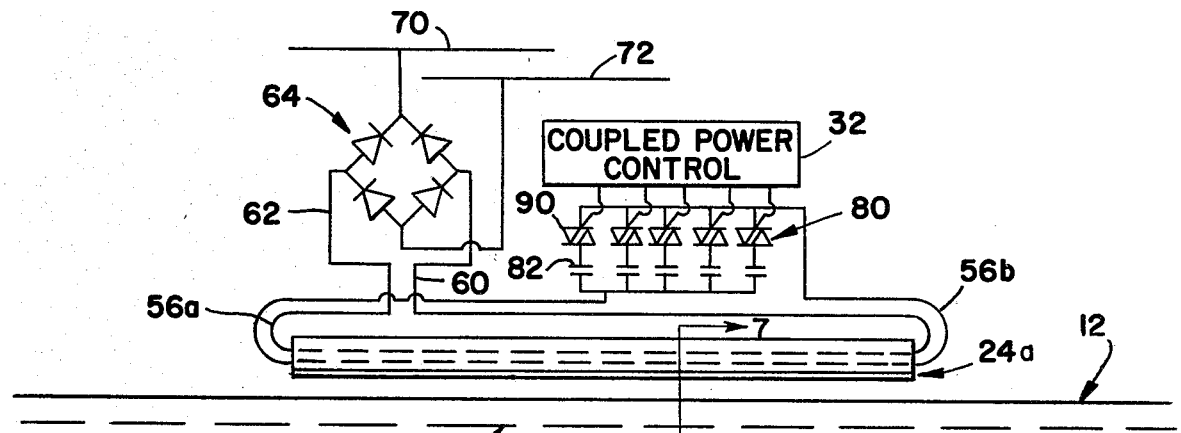
FIG_6
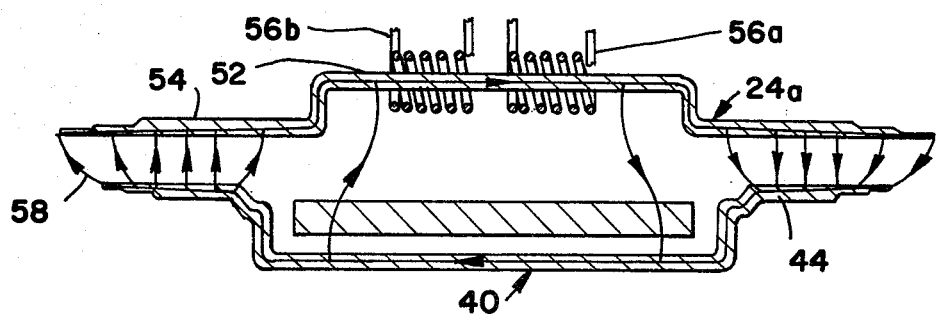
FIG_7

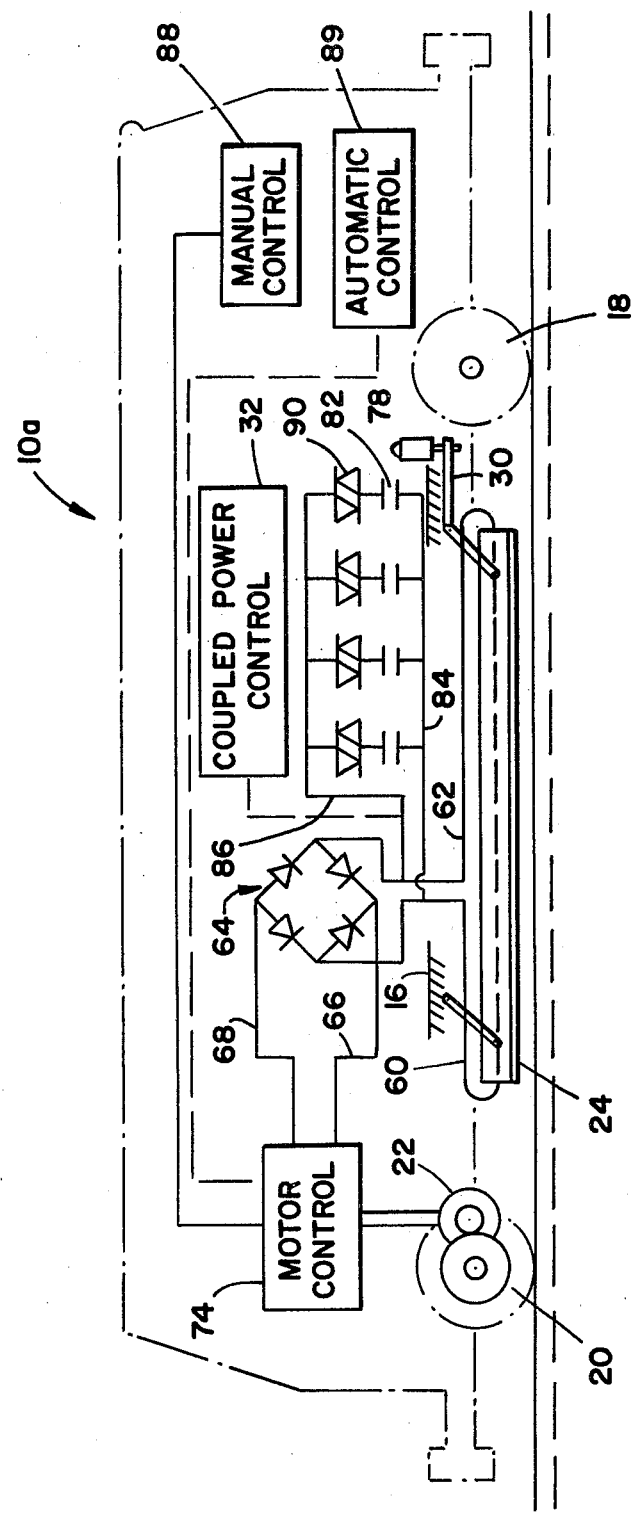
FIG_8

POWER CONTROL SYSTEM FOR ELECTRICALLY DRIVEN VEHICLE

BACKGROUND OF THE INVENTION

This application is a continuation-in-part application of Ser. No. 899,786, filed Apr. 25, 1978, now abandoned.

This invention relates to electric transportation systems and vehicles therefor and more particularly it relates to the control of inductively coupled power in vehicles for such transportation system.

Pollution problems created by the large numbers of existing internal combustion engines have caused a considerable research effort to be expended toward the development of pollution-free vehicular power plants. One of the alternatives suggested has been electrically driven vehicles having battery power sources. Although this approach has been used for some time for short-range special-purpose vehicles, such as golf carts and forklift trucks, conventional batteries are not well adapted for use as the primary energy source fo propel general purpose vehicles. Besides lacking sufficient ampere-hour capacity for extended use, the weight of conventional batteries seriously inhibits their use as the primary source of energy for general utility vehicles.

A possible solution to the inability of present batteries to act as the source of energy for general utility vehicles was proposed in U.S. Pat. No. 874,411. In this disclosure, an electrically powered vehicle is equipped with suitable batteries to drive the vehicle upon conventional roadways. A specially prepared roadway has one or more conductors associated therewith inductively coupled to a pickup on the vehicles for driving the vehicle on the specially prepared roadway and for charging energy storage means which typically comprise vehicle batteries but may also include other energy storage means such as a flywheel.

In my earlier U.S. Pat. No. 3,914,562 an improved electrically-driven vehicle is disclosed having suitable batteries to drive the vehicle on conventional roads and means thereon for receiving power from a conductor embedded in a prepared roadway for driving the vehicle and for charging the batteries. A special roadway with a continuous conductor for supplying power to an electrical vehicle is described in my U.S. Pat. No. 4,007,817. As discussed in my earlier patent, a means was provided on the vehicle for lowering the power receiving means to establish a small air gap with the conductor when operating on a specially prepared roadway and for raising the power receiving means to provide sufficient clearance to accommodate normal obstacles when the vehicle was operated on conventional roads. However, in this inductively coupled vehicle system, the inductance of the coupling is continually affected by vertical displacements caused by road roughness and vehicle suspension characteristics, thereby causing variations in the air gap resulting in power flow fluctuations. The inductance also changed due to lateral misalignments caused by steering imperfections. In the aforesaid prior patent means were provided on the vehicle for automatically maintaining the desired air gap between the roadway conductor and the power receiving means. This latter automatic gap-maintaining means comprised an electrical circuit including mechanical servo devices that actually moved and receiving means up and down relative to the roadway conductor in order to keep the air gap constant despite roadway irregularities. However, there are inherent problems and disadvantages such as added weight and maintenance in using servos to move the receiving means to maintain the air gap within precise limits in order to achieve the efficient transmission of power from the roadway conductor to the vehicle. Also, at high speeds a highly sensitive and relatively complex mechanism was required to accommodate abrupt changes in the roadway height or the presence of small obstacles thereon.

In other electric vehicles such as trains, it became desirable, in some instances, to fix the power receiving means in a lowered position, thereby eliminating the need for a raising and lowering mechanism. However, this required a means other than the servo system to regulate the transmission of power from the roadway conductor across a fixed air gap to the power receiving means.

The present invention provides for an improved adjustable power receiving means that solves the aforesaid problems.

BRIEF SUMMARY OF THE INVENTION

It is therefore one object of the present invention to provide an electrical vehicle for use in a system utilizing a roadway conductor and having a power receiving means capable of extracting power from the roadway at a uniform predetermined rate and without requiring rapid physical movements to accommodate small variations in the air gap distance caused by roadway or vehicle irregularities.

Another object of the present invention is to provide an electrical power transmission control system that will maintain a predetermined flow of electrical power from a roadway conductor to power receiving means on a vehicle which automatically varies the capacitance of the vehicle power receiving means and provide for a smooth transmission of power as the vehicle moves along.

Another object of the invention is to provide an electrical vehicle and roadway system wherein the number of ampere turns needed in the roadway is reduced by supplying capacitive ampere turns from the electrical power transmission control system of the vehicle.

The aforesaid and other objects of the invention are accomplished by a vehicle including a framework having a plurality of wheels thereon; an energy storing means, an electric motor for driving at least one of the wheels; means on the vehicle for receiving power from a conductor associated with a road including a pickup circuit for supplying power to the motor during travel therealong; means electrically interconnecting the power receiving means, the energy storing means and the electric motor; and variable capacitor means connected to the pickup circuit of the power receiving means and operative when the vehicle is traveling on a road having a conductor associated with the power receiving means for maintaining a constant voltage output at a preselected level despite variations in the air gap distance between the power receiving means and the roadway conductor.

Although a vehicle according to the invention will be preferably provided with an energy storing means such as a battery to provide power for use when off of the electrified roadway, vehicles without such energy storing means may also be provided within the scope of the invention. For example, vehicles in mines or other people or freight moving facilities may be designed to remain constantly on a closed loop roadway system.

Other objects, advantages and features of the invention will become apparent from the following detailed description of one embodiment thereof, presented in conjunction with the accompanying drawing.

BRIEF DESCRIPTION OF THE DRAWING

FIG. 1 is a schematic view of a vehicle equipped with the device of this invention illustrating the power receiving means in its lowered position;

FIG. 2 is an enlarged view in section taken along the line 2—2 of FIG. 1 showing the roadway and the power receiving means for the vehicle;

FIG. 3 is an enlarged schematic view of the magnetic components of the power conductor and pickup;

FIGS. 4a-4c are a series of diagrams illustrating the coupling magnetomotive force relationships;

FIG. 5 is a schematic view partially in perspective showing the basic coupling force relationship using a compensating capacitor according to the invention;

FIG. 6 is a schematic view of a vehicle embodying a modified form of the invention using separate power and control windings for the power receiver;

FIG. 7 is an enlarged view in section taken along line 7—7 of FIG. 6; and

FIG. 8 is a schematic view of an another embodiment of a vehicle embodying the invention.

DETAILED DESCRIPTION OF THE PREFERRED EMBODIMENTS

Referring to the drawing, FIG. 1 shows a vehicle 10 according to the present invention as it appears when operating on a road or traffic surface 12 which has associated therewith a power source 14 for transmitting energy to the vehicle 10. The vehicle 10 comprises as major components a framework 16, a pair of steerable front wheels 18, a pair of rear wheels 20 driven by an electric power 22, pickup means 24 for receiving power from the power source 14, a battery or energy storage means 26, means 28 operatively connecting the power-receiving means 24 and the energy storage means 26 to the electric motor means 22 for driving the vehicle 10, means 30 for raising and lowering the power receiving pickup means 24 relative to the road 12, and coupled power control means 32 for maintaining a predetermined level of voltage to the vehicle.

In operation on the road 12, the raising and lowering means 30 is manipulated to position the pickup means 24 closely adjacent the power source 14 to reduce the air gap therebetween. Energy is inductively coupled from the power source 14 to the pickup means 24 and is transmitted through the connecting means 28 to the energy storage means 26 and/or the motor 22. When traveling along the road 12, sufficient energy may be inductively coupled to the pickup means 24 to charge the energy storage means or battery 26 as well as to drive the motor 22. The pickup means can be positioned so that the air gap between the core of the power source 14 and the power receiving means 24 is relatively small thereby enhancing the power transfer capacity of the inductive coupling therebetween.

When the vehicle 10 is traveling along a conventional road which is not equipped with a power conductor, the raising and lowering means 30 is manipulated to raise the power receiving means 24 to provide clearance under the vehicle 10 sufficient to accommodate normally encountered roadway hazards such as driveway gutters, parking ramps and the like. In this mode of operation, the vehicle 10 is driven by the motor 22 which is energized from the battery 26. Thus, the vehicle is alternatively capable of achieving a small air gap between inductively coupled elements for propelling the vehicle along a specially prepared roadway and providing substantial clearance beneath the vehicle for operating on a conventional road.

In my previous U.S. Pat. No. 3,914,562 relating to an electrically driven vehicle the power receiving means is moved toward and away from the power source in the ground in order to maintain an optimum air gap distance despite variations in the roadway surface. However, in the present invention, this mechanical manipulation is not required, and the power receiving means 24 is lowered to a fixed running position relative to the roadway having a power source, its lowermost position being controlled by a suitable mechanical stop (not shown). In this fixed running position the power receiving means is held at a level high enough to avoid roadway obstructions while providing a preselected air gap distance from the roadway power source. Now, when physical variations in the roadway surface or other factors such as the condition of the vehicle wheels, tends to vary the air gap distance from its optimum, the present invention automatically compensates for such variations without physically moving the power receiving means.

The specially prepared road or traffic surface 12 is illustrated in FIG. 2 and is described in greater detail in my previous U.S. Pat. No. 4,007,817. It is contemplated that heavily traveled thoroughfares, for example, freeway networks surrounding major cities, may be modified or constructed as discussed hereafter. The typical commuter driving the vehicle 10 would operate under battery supplied power until reaching the freeway. On the freeway, the vehicle 10 would be driven by energy inductively coupled from the power source 14. Coupled energy in excess of vehicle consumption would add charge to the battery. Upon exiting from the freeway, the vehicle 10 would again be driven by battery supplied power. In this fashion, the battery 26 can be periodically charged to provide an acceptable range of travel off the specially prepared road 12.

To construct the road 12, a shim layer 34 of concrete may be applied to a pre-existing road surface 36 to modify an existing freeway or may be applied in the construction of a new highway. A source conductor 38, which may be made of segmented aluminum or the like, is embedded in the shim layer 34, as by positioning the same in a recess provided by a source core 40. The source core 40 may be made of a ferrous metal such as laminated transformer steel and includes a central depressed core section 42 and a pair of elevated lateral core sections 44 which serve as magnetic poles. An insulating section 46 surrounds the source conductor 38 and prevents electrical contact between the conductor 38 and the core 40. As shown best in FIG. 2, the central portion of the insulating section 46 is elevated slightly to minimize short circuiting of magnetic flux in the event an iron strip or other piece of ferro-magnetic debris comes to rest laterally across the poles 44.

The power for the source conductor 38 preferably comes from a constant current supply so that the source voltage rises and current phase changes as vehicle loading increases. Alternating current power may be supplied from high voltage transmission lines which parallel or periodically intersect the road 12. Alternating current of any desired frequency may be used although frequencies between 100-400 Hertz are presently most desirable.

The power receiving pickup means 24 comprises a pickup core 50 including a central elevated section 52 and a pair of lateral sections 54 disposed closer to the road 12 which serve as magnetic poles. The width of the pickup core 50 comprises a substantial part of the width of the vehicle 10 and exceeds the width of the source core 40 in order to provide a measure of lateral positional tolerance without appreciably decreasing the energy coupled between the source core 14 and the power receiving pickup 24. The pickup core 50 comprises a ferrous metal or steel section, the length of which is a substantial fraction of the length of the vehicle 10. A pickup coil 56 is wound about the central core section 52.

The pole area of the pickup means 24 is accordingly substantial which allows a low flux density magnetic field to couple significant energy to the vehicle 10. This provides several different advantages. The downward force acting on the power receiving pickup means 24 is proportional to the square of the flux density. Accordingly, the suspension of the vehicle 10 is affected only slightly by magnetic forces when traveling on the road 12 as compared to travel on a conventional road. Low flux density also allows practical vehicle clearance without requiring excessive ampere-turns in the primary. This advantage is reflected in smaller conductor size and lower cost thereof. Low flux density is is also advantageous since the heating effect of the magnetic field in stray steel is an approximate function of the square of the flux density.

The magnetic circuit 58 coupling the power source 14 and the pickup means 24 is illustrated in FIG. 3. The current flowing in the pickup coil 56 is determined by the net amount of coupled flux since the voltage in the secondary coil is established by the battery 26 as will be more apparent hereinafter. It will be noted that the current in the secondary coil 56 causes ampere-turns which vectorially oppose the fixed ampere-turns of the power source 14. Accordingly, the coupled energy is self-limiting and can be regulated by adjusting the air gap between the source core 40 and the pickup means 24.

As used herein, the term battery encompasses any means of storing electrical energy, such as conventional lead-acid batteries, alkaline batteries, fuel cells, flywheels and the like.

Referring again to FIGS. 1 and 2, the secondary coil 56 is connected by the means 28 to deliver electrical energy to the motor 22. The connecting means 28 includes a pair of wires 60,62 leading to a rectifier bridge 64. The rectifier bridge 64 is connected by leads 66,68 to a pair of wires 70,72 respectively. The wires 70,72 extend between the battery 26 and a motor control mechanism 74.

The motor control mechanism 74, as described in detail in my previous U.S. Pat. No. 3,914,562, provides the means for controlling the speed of the vehicle 10 in both forward and reverse directions and receives control signals from a manual control mechanism 88 conveniently positioned near the driver's seat. A foot pedal (76 for a hand throttle in the manual control system 88) provides a torque demand signal to the motor. The mechanism 88 also includes a position control means connected to a motor 78 that drives the linkage for lowering the power receiver 24 to its fixed running position relative to the roadway 14 and then raising it when the vehicle is used on a conventional roadway.

When the power receiver 24 has been lowered to its fixed position to form an air gap just above the power roadway conductor, the voltage in the roadway conductor is inductively coupled into the power receiver for use by the vehicle and its level is controlled by the coupled power control means 32. This latter control means is provided in combination with a series 80 of capacitors 82, connected in parallel, as shown schematically in FIG. 1, to a pair of leads 84 and 86 which are connected to the leads 60 and 62, respectively, from the rectifier bridge 64. In series with each capacitor is a switch means such as a triac 90. The gate terminal of each triac is connected to the coupled power control means 32 which may be provided in the form of a separate electronic logic circuit or a commercially available solid-state microprocessor. This power control means is connected to and therefore supplied with inputs from other elements of the vehicle power system. A first input through a lead 94 is supplied to the power control logic circuit 32 from a transducer 96 attached to the lead 72 interconnecting the energy storage device 26 and the motor control unit 74. A second input is supplied through a lead 98 direct from a sensor 100 on the energy storage device that detects its charged state. A third feedback input is provided to the power control means 32 through a lead 102 that detects the voltage applied to the capacitor bank 80.

The basic function of the coupled power control means is first to assure that the power coupled through the pickup 24 generates a voltage that is high enough to supply the power required by the propulsion system 22 on the vehicle and to supply charging current to the energy storage device 26. The power required at any given time can vary depending on the vehicle speed, the grade it is on, its load and the power level demand exerted by the operator as indicated schematically by the foot pedal 76 and its lead 77 to the motor control in FIG. 1. A second function of the power control means is to modulate the charging current to the energy storage device 26 (if one is provided) to a level that it will accept without damage. These basic functions are performed despite the varying operating conditions of the vehicle and the condition of the energy storage device. Whether the energy storage device is a battery, a flywheel or some other constant voltage type of device, the current in or out of that particular device is a strong function of the voltage across the load. In the case of a battery the rate of charging current depends on the state of charge of the battery. If the battery is thoroughly discharged it can be charged at a fairly high rate, and if it is almost fully charged, then it can accept only a trickle charge without being damaged or causing gas evolution. In the case of a flywheel, if the flywheel is spun down to a low speed, then it will accept a charge very rapidly until it approaches its design, maximum speed limit, and thereafter its charging rate has to be modulated to only make up its spinning losses.

Thus, in the power control circuit described above, the transducer 96 senses the current flowing in line 72 either to or from the energy storage device. If, for example, a condition exists wherein the motor 22 is demanding more current than the pickup power receiver 24 is presently trimmed to supply, then energy will flow out of the battery or flywheel to make up the difference. The transducer 96 will recognize that the energy (current) flow is out of the energy storage device and will tell the coupled power control means or microprocessor that it needs more current from the pickup or power receiver 24. The microprocessor's response to that will be to switch more capacitance into the power pickup circuit by providing a signal to one or more of the triacs 90, thereby raising the output voltage from the power receiver. When the voltage rises high enough, the battery will commence to accept charge rather than make up the deficiency to the propulsion motor. The other input parameter that may be of importance to the microprocessor is the state of charge sensor 100 which, when a battery is used, provides an output signal commensurate with its state of charge. In response to this signal the microprocessor is programmed so that it will limit the charging current to a level that the battery can accept without damage.

The electrical effect of switching a capacitor 82 into and out of the vehicle power circuit in order to control the voltage from the power receiver is illustrated diagrammatically in FIGS. 4a to 4c. These figures show the relationship in phase and magnitude of the Exiting Ampere turns ($NI_e$), the Source Ampere turns ($NI_s$), the Load Ampere turns ($NI_L$) and the Capacitive Ampere turns ($NI_c$).

Normally, the power source 14 in the roadway operates with a constant current. Thus, with no current being drawn from the power pickup 24, the source current provides the only ampere turns in the circuit and they will excite a given voltage in the pickup. That is, the circulating flux will be directly in phase with the source current ($NI_s$) and thus induce a voltage ($E_I$) in the pickup circuit that is 90° out of phase with that source current (see FIG. 4a). When a load is applied to the pickup side of the coupling, then ampere turns begin to flow that are also common to the magnetic circuit, and a vectorial addition must be made of the ampere turns in the power source and the ampere turns in that load ($NI_L$) in order to determine what the net ampere turns or exciting ampere turns ($NI_e$) are in the coupling circuit. As shown by the diagram of FIG. 4b, the vector addition of those two components $NI_s$ and $NI_L$ tends to reduce the exciting ampere turns $NI_e$ in the circuit because the load ampere turns, in effect, subtract vectorially from the source ampere turns. Since the exciting ampere turns have been reduced, then the induced voltage ($E_I$) has also been reduced. In order to restore the induced voltage to its original magnitude or perhaps even increase it to an operating voltage higher than the voltage with no load, capacitance is applied to the pickup circuit as shown in FIG. 4c. When this is done ampere turns flow in the pickup circuit that are directly in phase with the exciting ampere turns and thus they add to and increase the coupled or induced voltage. In accordance with the present invention the adding or subtracting of capacitive currents on the pickup side to change the exciting ampere turns in the magnetic circuit and thus regulate the induced voltage is accomplished by the selective switching of the capacitors 82 where their respective triac switches are triggered by appropriate signals from the power control unit or microprocessor. In addition to controlling the application of voltage to either the energy storage unit or the driving motor, as described, the capacitors are used to maintain constant voltage output from the power receiver 24 despite variations in the air gap between the power receiver and the roadway power source.

For example, assume that the vehicle 10 is traveling along a roadway having a power source 14 and its power receiver 24 is in its lowered fixed position which normally establishes some preselected air gap distance. If, for some reason, the air gap is reduced, then the ampere turns in the circuit will drive more flux through the pickup core because the reluctance has dropped. This causes a rise in the induced voltage ($E_I$) in the pickup circuit because more flux is circulating around its conductors. This increased voltage would be sensed by transducer 96, because more current begins to flow to the energy storage device. When this happens, the microprocessor recognizes that the current is excessive and responds by producing an output signal to cut out an appropriate capacitor or combination of capacitors from the power circuit, thereby restoring the output voltage to the proper level. In the case of the battery powered vehicle, the battery voltage is the dominant parameter. Thus, the voltage level of the system is set so that the battery will accept an appropriate amount of charge while it is operating on the power roadway, assuming that there is always adequate power furnished to the driving motor. It is possible that at some times the power receiver or pickup cannot supply both the full propulsion requirements as well as the maximum charging demand of the energy storage device. In that case, the voltage output would be less than optimum, and the energy storage device might receive no charge or it might even have to contribute to that momentary overload in the propulsion system. Using known techniques, the microprocessor 92 can be programmed to respond to all of these varying conditions.

The power receiver 24 has been described thus far as utilizing a single winding for the pickup coil 56, as shown in FIG. 3. However, it may be preferable under certain conditions to utilize a dual winding arrangement because often the voltage and current requirements of the power circuit on the vehicle, that is, the propulsion power circuit, are quite different from those best suited to the components of the control circuit. For example, it may be less expensive to use high voltage capacitors to perform the control function, whereas, it is more desirable to use a lower power voltage to match a particular battery or flywheel circuit. In order to accommodate this flexibility, a modified form of pickup or power receiver 24a is used, as shown in FIGS. 6 and 7. Here, two separate windings 56a and 56b are provided in a side-by-side relationship around the central core section 52, the winding 56a being for power and winding 56b being for control. With this arrangement, as indicated in FIG. 7, the magnetic flux circulates through the core section 52 and links both windings. Since that flux links both the power and control conductors, the volts per turn that are induced in those conductors are exactly the same. This also applies to the power source conductor. Thus, putting more conductors, for example, in the control winding, results in a summed voltage that is higher than that provided by the power winding. The separate windings are connected to their respective power and control terminals as shown in FIG. 6. Thus, winding 56a is connected directly to the rectifier and winding 56b is connected to the bank of controlling capacitors arranged in parallel.

An inherent advantage provided by the present invention is that it enables the powered roadway to utilize a minimum of ampere turns by providing capacitive ampere turns in the electrical power transmission control system of the vehicle. This minimizes the cost of the required roadway power system.

Although the vehicle 10 has been described and illustrated as having a movable power receiving means 24 which is lowered for us on a prepared roadway with a power conductor and then raised for off-road use, the present invention is also applicable for other electric vehicle such as trains wherein the power receiving means may be provided in a fixed lowered position. In such other vehicles the power receiving means is mounted directly above and forms a nominal air gap with the roadway conductor. As with the vehicle 10 small variations in the air gap distance which may occur as the vehicle is moving, as well as varying power demands of the drive motor, are automatically compensated for by the electrical control means, as previously described.

The present invention is also applicable to vehicles of the type described which do not have or require an energy storage device such as a battery if the vehicles are intended to remain on the roadway at all times. For example, such vehicles may be used in and exclusively for an electrical transportation system for a mine, an amusement park, a materials handling depot, or some other facility having a roadway equipped with a power source as described. The construction of the power receiving pickup means 24 is as previously described. In this embodiment, the coupled power control is also provided in combination with a series of capacitors 82, connected in parallel, as shown schematically in FIG. 8. Each capacitor 82 is connected in series with a switch means such as a triac 90, whose gate terminal is connected to the power control means. A pair of leads 84 and 86 connected in parallel to the capacitor and triacs, respectively, are also connected to leads 60 and 62 from the pickup means 24 to a rectifier bridge 64. The latter is connected by leads 66 and 68 to the motor control 74 in the same manner as previously described with respect to vehicle 10. A manual control 88 or a pre-programmed automatic control 89 may be used to furnish the necessary signals to the motor control for increasing or decreasing vehicle speed in the conventional manner. With such controls, it should also be apparent that various complex control algorithms could be used, if desired. For example, a sensory input from the manual or automatic vehicle control may be provided to the coupled power control so that the output voltage is lowered when little or no power is being requested by the vehicle controls, and is raised when high power is being requested. In any event, as long as the vehicle 10a remains on the electrified roadway, it does not require an energy storage device. As shown in FIG. 8, such a vehicle 10a may have a simplified power system without an energy storage device while still embodying the principles of the invention. Thus, iN the vehicle 10a the coupled power control 32 wilp respond only to changes in the voltage output of the power receiving pickup means 24 in order to maintin a constant voltage supply to the motor control 74. As with the vehicle 10, the vehicle 10a comprises a suitable framework 16 or chasis with at least one set of steerable wheels 18 and rear wheels 20 driven by an electric motor 22. The power receiving means 24 could be mounted in a fixed position to provide a predetermined air gap with the conductor of an electrified roadway, or it could be mounted for raising and lowering, as with vehicle 10.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A vehicle for use on a prepared road having associated therewith a power source including a magnetic circuit containing a ferrous metal core to create a magnetic field, the vehicle comprising:
   a framework having a plurality of road engaging elements thereon;
   an electric motor for driving at least one of said elements;
   power receiving means on the vehicle containing a ferrous metal core for receiving magnetic flux from the power source in quantities proportional to the degree of magnetic coupling between said power source and the power receiving means to supply received power to said vehicle during travel along the road;
   means for retaining the power receiving means in a fixed running position relative to the vehicle framework so that a relatively small air gap is established between the power receiving means and the power source;
   a source of energy for supplying power to the electric motor when the power receiving means is not coupled to the power source;
   circuit means electrically connecting the power receiving means, the source of energy and electric motor; and
   electrical control means connected to the power receiving means and operative when the vehicle is traveling along a prepared road including means responsive to the voltage level of said power receiving means and also means responsive to the voltage level of said source of energy for maintaining substantially constant preselected voltage output from said power receiving means.

2. The vehicle as described in claim 1 wherein said electrical control means comprises: preprogrammed electronic logic means; transducer means for sensing the direction and value of current flowing between said electric motor and said energy source and for furnishing an input signal to said logic means; capacitor means connected to said power receiving means; and switch means connected to said capacitor means and controlled by said logic means; whereby capacitance is added to or subtracted from the power receiving means circuit to vary its voltage output in response to current changes detected by said transducer means and processed through said logic means.

3. The vehicle as described in claim 2 wherein said electronic logic means comprises a microprocessor.

4. The vehicle as described in claim 2 wherein said capacitor means comprises a bank of capacitors connected in parallel, each of said capacitors having an electronically controlled switch in series therewith whose control element is connected to an output from said logic means.

5. The vehicle as described in claim 2 wherein said energy source is a rechargeable battery and sensor means on said battery for providing a signal to said logic means commensurate with the state of charge of the battery.

6. The vehicle as described in claim 4 wherein said power receiving means comprises a central core and a single winding, said bank of capacitors being in parallel with said single winding.

7. The vehicle as described in claim 6 wherein said power receiving means comprises a central core with a pair of first and second windings around said core, said first winding being a control winding and connected to said bank of capacitors, said second winding being a power winding and connected to said circuit means for said motor and sand energy source.

8. The vehicle as described in claim 1 wherein said circuit means includes an electrical capacitance means and wherein said electrical control means includes means for varying said capacitance.

9. A vehicle for use on a prepared road having associated therewith a power source including a magnetic circuit containing a ferrous metal core to create a magnetic field, the vehicle comprising:
- a framework having a plurality of road engaging elements thereon;
- an electric motor for driving at least one of said elements;
- power receiving means on the vehicle containing a ferrous metal core for receiving magnetic flux from the power source in quantities proportional to the degree of magnetic coupling between said power source and the power receiving means to supply received power to said vehicle during travel along the road;
- means for retaining the power receiving means in a fixed running position relative to the vehicle framework so that a relatively small air gap is established between the power receiving means and the power source;
- circuit means electrically connecting the power receiving means and electric motor; and
- electrical control means connected to the power receiving means and operative when the vehicle is traveling along a prepared road including means responsive to the voltage level of said power receiving means for maintaining substantially constant preselected voltage output from said power receiving means.

10. A vehicle for use on a prepared road having associated therewith a power source including a magnetic circuit containing a ferrous metal core to create a magnetic field, the vehicle comprising:
- a framework having a plurality of road engaging elements thereon;
- an electric motor for driving at least one of said elements;
- power receiving means on the vehicle containing a ferrous metal core for receiving magnetic flux from the power source in quantities proportional to the degree of magnetic coupling between said power source and the power receiving means to supply received power to said vehicle during travel along the road;
- means for retaining the power receiving means in a fixed running position relative to the vehicle framework so that a relatively small air gap is established between the power receiving means and the power source;
- a source of energy for supplying power to the electric motor when the power receiving means is not coupled to the power source;
- circuit means electrically connecting the power receiving means, the source of energy and electric motor; and
- electrical control means connected to the power receiving means and operative when the vehicle is traveling along a prepared road including means responsive to the voltage level of said source of energy for maintaining substantially constant preselected voltage output from said power receiving means.

11. The vehicle as described in claim 10 wherein said electrical control means comprises:
- preprogrammed electronic logic means;
- transducer means for sensing the direction and value of current flowing between said electric motor and said energy source and for furnishing an input signal to said logic means;
- capacitor means connected to said power receiving means; and
- switch means connected to said capacitor means and controlled by said logic means, whereby capacitance is added to or subtracted from the power receiving means circuit to vary its voltage output with respect to current changes detected by said transducer means and processed through said logic means.

12. The vehicle as described in claim 11 wherein said capacitor means comprises a bank of capacitors connected in parallel, each of said capacitors having an electrically controlled switch in series therewith whose control element is connected to an output from said logic means.

13. The vehicle as described in claim 12 wherein said power receiving means comprises a central core and a single winding, said bank of capacitors being in parallel with said single winding.

14. The vehicle as described in claim 13 wherein said power receiving means comprises a central core with a pair of first and second windings around said core, said first winding being a control winding and connected to said bank of capacitors, said second winding being a power winding and connected to said circuit means for said motor and said energy source.

* * * * *